INVENTOR
A. M. JOHNSON
BY
ATTORNEY 3,292,108
TRAVELING WAVE COAXIAL LIGHT
MODULATOR
August M. Johnson, Middlesex, N.J., assignor to Bell
Telephone Laboratories, Incorporated, New York,
N.Y., a corporation of New York
Filed Apr. 19, 1963, Ser. No. 274,171
3 Claims. (Cl. 332—7.1)

This invention relates to light modulators, and, more particularly, to traveling wave light modulators utilizing electro-optic effects.

Heretofore, the use of electromagnetic radiation at light frequencies for the transmission of information has not been feasible because of the incoherent nature of the light. With the invention of the optical maser, which generates coherent electromagnetic radiation at light frequencies, the use of light as information bearing radiation has become feasible. It can readily be appreciated that coherent light is capable of carrying extremely large quantities of information because of the bandwidth available, but in order to realize the maximum information bearing capacity of the light waves, it is necessary that efficient, broadband modulating apparatus be provided.

In an article entitled, "Microwave Modulation of the Electro-Optic Effect in $KH_2PO_4$," by I. P. Kaminow, Physical Review Letters 6, May 15, 1961, at pages 528–529, there is described a light modulator which utilizes a cylindrical cavity resonator having a rod of KDP ($KH_2PO_4$) mounted coaxially therein. Light is directed into the cavity for travel axially along the rod, and microwave modulating energy is introduced into the resonator by waveguide means mounted in a position to excite a $TM_{01}$ type mode. The $TM_{01}$ type mode is especially useful in such a configuration inasmuch as the electric field is concentrated along the axis of the resonator, where the KDP rod is located, and is parallel to the direction of travel of the light beam. It is possible to adjust the propagation velocity of this mode to be in synchronism with the velocity of the light to produce a traveling wave interaction and modulation of the light. The modulation phenomenon itself is explained in the aforementioned Kaminow article, and will not be elaborated upon here.

While such an arrangement produces light modulation, it suffers from certain drawbacks. The means of coupling microwave energy into the resonator produces the desired $TM_{01}$ type mode, but it also produces spurious modes which are highly undesirable inasmuch as they tend to reduce modulating power and introduce spurious modulations. In addition, the input coupling means places a frequency limitation on the structure and hence the bandwidth inasmuch as it possesses high and low frequency cut-off points. Efforts to reduce these effects have heretofore resulted in complicated and expensive structures which have not always been successful or feasible.

It is an object of the present invention to produce broadband modulation of a light beam.

It is another object of the present invention to excite a modulator cavity in a manner such that spurious modes and frequency limitations are substantially eliminated.

It is a further object of the present invention to produce efficient light modulation in a relatively simple structure.

These and other objects of the present invention are achieved in an illustrative embodiment thereof which comprises a cylindrical cavity resonator having an elongated rod of electro-optic material mounted coaxially therein, the remainder of the cavity being filled with insulating material such as, for example, polystyrene of suitable dielectric constant to provide a match between the microwave and light velocities. This insulation also functions as a support for the rod. The end walls of the cavity resonator are centrally apertured so that a beam of light may be directed through the resonator from a source to a load or utilization device, passing axially along the rod as it traverses the resonator.

Microwave modulating energy is introduced from a source into the resonator by means of a coaxial cable. The cable extends from the source to a point where it intersects the axis of the light beam and the resonator, at which point it has a bend of sufficient magnitude to align the center conductor axially with the resonator and light beam. From the bend the cable extends to the input end of the resonator, with the inner conductor abutting or nearly abutting the rod of the electro-optic material and the outer conductor abutting or nearly abutting the insulation. In order that the light beam is not blocked by the cable, the outer conductor of the cable is apertured at the bend to permit the light to enter the cable, and the inner conductor, which is axially aligned with the beam and resonator, is hollow, so that the light passes therethrough and into the resonator.

A coaxial cable does not possess a low frequency cut-off, hence it makes an ideal broadband coupling device. In addition, it propagates an essentially pure TEM mode. The distance from the bend to the resonator is therefore of a length to insure that any spurious modes generated at the bend are damped out and the microwave energy at the input to the resonator is in a substantially pure TEM mode. This mode converts to a $TM_{01}$ type mode as it enters the resonator because of the presence of a longitudinal component in the electric field at the abrupt ending of the coaxial line. Coupling symmetrically with respect to the axis of the resonator and line results in a minimum of spurious modes. In addition, the metallic end wall of the resonator, which shorts the electric field and maximizes the magnetic field, produces the desired condition for creating and maintaining a strong $TM_{01}$ mode in the resonator with a minimum of spurious modes.

Accordingly, it is one feature of the present invention that the microwave modulating energy is introduced into the modulating resonator by means of a coaxial cable and coaxially with the light beam.

It is another feature of the present invention that the center conductor of the coaxial cable is hollow along that portion of its length that is aligned with the resonator axis and the outer conductor of the cable is apertured to permit passage of the light beam along the length of and within the hollow conductor.

These and other features of the present invention will be more readily apparent from the following detailed description, taken in conjunction with the accompanying drawings, in which.

Figure 1:
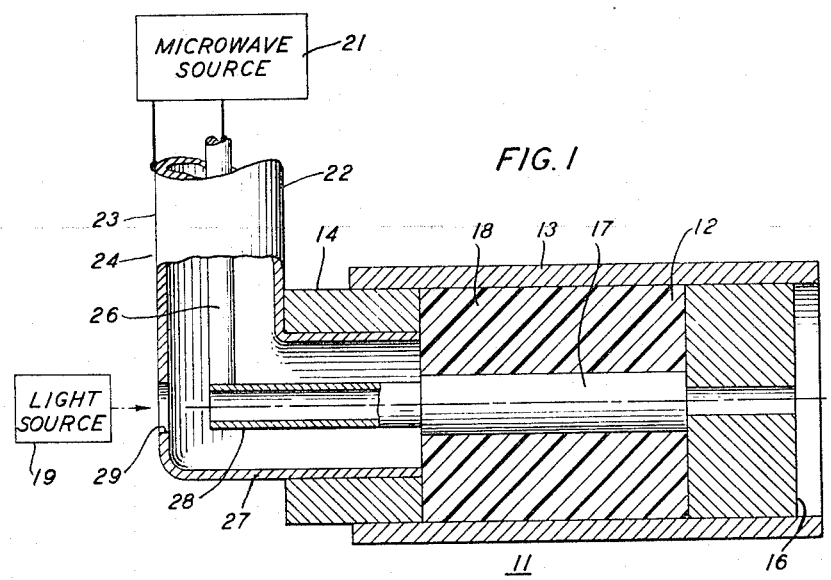
FIG. 1 is a sectional view of a preferred embodiment of the invention.

Turning now to FIG. 1, there is shown a modulating arrangement 11 comprising a cavity resonator 12 having an outer wall 13 of suitable conducting material, and apertured input and output end walls 14 and 16, respectively, likewise of suitable conducting material. Mounted within resonator 12 coaxially therewith is a rod 17 of suitable electro-optic material, such as, for example, KDP. Rod 17 is supported within resonator 12 by insulating material 18, which preferably fills the remainder of resonator 12 and is a material, such as polystyrene, which permits synchronization of the traveling microwave energy in the resonator and the traveling light energy in the rod 17.

A source 19 of optical wave energy to be modulated is disposed so that the light emitted thereby is directed along the axis of the resonator 12 and rod 17. Source 19 is preferably an optical maser of any one of a number of well-known types, although it may take other forms also.

Microwave modulating energy is supplied to cavity resonator 12 from a source 21 through a coaxial coupling arrangement 22. Coupling arrangement 22 comprises a first section 23 of coaxial cable having an outer conductor 24 and an inner conductor 26 which extend from source 21 toward the axis of the light beam and of resonator 12. Coupling arrangement 22 further comprises a second section 27 of coaxial cable having a hollow inner conductor 28, the axis of which coincides with the light beam and resonator axis and which extends from the input of the resonator to a point where it meets and is connected to conductor 26. The outer conductor of section 27 is a continuation of outer conductor 24 which is bent as shown at the intersection of conductors 26 and 28 so that it extends to the input of cavity 12 and is coaxial therewith. This section of the outer conductor 24 fits snugly in the aperture in member 14 and may be attached to member 14 by brazing or other suitable means. In order that light from source 19 may enter the resonator 12 through hollow conductor 28, conductor 24 has an aperture 29, the axis of which coincides with that of the light beam, conductor 28, and cavity resonator 12. As a consequence, light from source 19 travels unimpeded to the input of resonator 12.

In operation, the light travels along rod 17, while microwave modulating energy from source 21 travels along the coaxial cable input arrangement 22 as a pure TEM mode until it negotiates the bend in the cable. The bend creates spurious modes, but, because of the tendency of coaxial cables to transmit a pure TEM mode, these spurious modes are damped out because the distance from the bend to the resonator input is of sufficient length to accomplish this. At the abrupt ending of the coaxial cable, there is created a fringing electric field having a longitudinal component, which gives rise in resonator 12 to a $TM_{01}$ type mode. Because of the symmetrical arrangement of the input, this $TM_{01}$ mode is substantially pure, and there are substantially no spurious modes in the resonator.

Resonator 12 is of a length that is some multiple of half wavelengths of the microwave energy. As a consequence, a standing wave is established in the resonator. As pointed out in the aforementioned Kaminow article, the forward traveling compound of the microwave field is synchronized with the forward traveling light beam to produce the desired modulation of the light, while the backward traveling component does not interfere with the modulation process. In the arrangement of FIG. 1, a degree of tuning is possible when members are made slidable with respect to member 14. After the desired tuning is achieved, member 13 may be secured in any suitable manner to member 14. In order that the traveling wave interaction may be made efficient, it is desirable that the resonator 12 and rod 17 be several half wavelengths long, thus assuring a strong modulation of the light.

After traversing the resonator, the light passes through the aperture in member 16 to a suitable utilization device not shown. If desired, polarizers or other types of light analyzers may be used in the manner suggested in the aforementioned Kaminow article.

Figure 2:
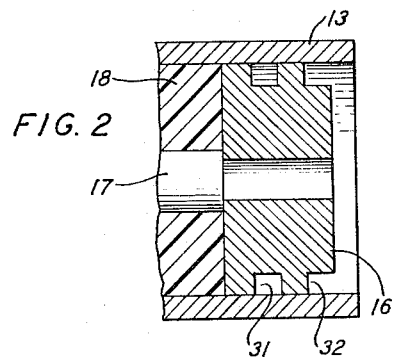
FIG. 2 is a sectional view of a modification to the output of the arrangement of FIG. 1.

The arrangement of FIG. 1, by virtue of the unique input, produces highly efficient modulation of the light beam, with, as can readily be appreciated, a very simple structure. Ordinarily, the microwave energy is dissipated within the rod 17 and the insulating material 18 and it is not necessary to provide other means to dissipate the energy. Where, however, it is desired to insure that no microwave energy escapes, member 16 may have its outer perimeter slotted to form quarter wave chokes, as shown in FIG. 2, where annular slots 31 and 32 effectively prevent the escape of microwave energy.

Figure 3:
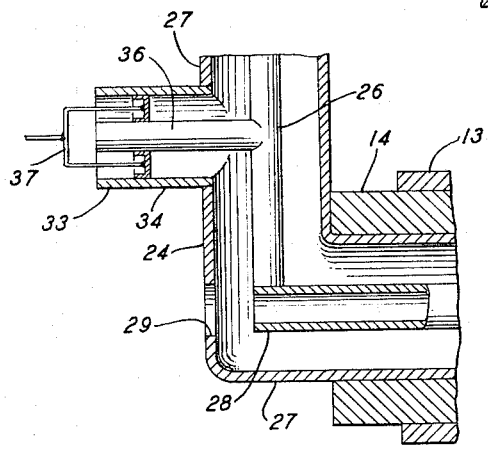
FIG. 3 is a sectional view of a modification to the input of the arrangement of FIG. 1.

Ordinarily, because of its symmetrical construction and the broadband characteristics of the coaxial cable input, matching is not a problem. However, where more precise matching and tuning are desired, an arrangement such as is shown in FIG. 3 may be used. In FIG. 3, the section 23 of coaxial cable has a stub tuner 33 comprising an outer conductor 34 and an inner conductor 36, with a shorting plunger 37 which gives a more precise tuning and matching.

From the foregoing, it can readily be seen that efficient broadband modulation of light is achieved through the use of a simple, inexpensive input structure. One of the advantages of such an input structure is that the single structure is readily usable with a variety of cavity resonators because of its exceedingly broadband characteristics thereby eliminating the necessity of making large numbers of dimensional changes to accommodate different frequency ranges.

While certain materials have been discussed, it is to be understood that various other materials may also be used. In addition, various changes and modifications may occur to workers skilled in the art without departing from the spirit and scope of the invention.

What is claimed is:

1. A light modulator comprising an elongated member of electro-optic material forming the center conductor of a coaxial cavity resonator, means for simultaneously applying light energy to said material for travel axially therealong and modulating energy to said resonator comprising a coaxial cable, said coaxial cable having a hollow center conductor through which said light energy is directed and which terminates adjacent one end of said material, said resonator having an exit aperture aligned with the axis of said hollow center conductor.

2. A light modulator as claimed in claim 1 wherein the outer conductor of the coaxial cable has an aperture, the axis of which is aligned with the axis of said hollow center conductor.

3. A light modulating system comprising a source of light energy to be modulated, a coaxial cavity resonator having a center elongated member of electro-optic materials along which light from said source travels, a source of modulating energy, means for simultaneously symmetrically introducing the modulating energy and the light energy into said resonator comprising a coaxial cable extending from said modulating source to said resonator, said coaxial cable having a hollow center conductor aligned with the axis of said material and an outer conductor having an aperture therein, the axis thereof being aligned with the axis of said hollow center conductor, said cable terminating adjacent said resonator and means within said resonator for synchronizing the velocity of the modulating energy in the resonator with the velocity of the light energy in said material, said resonator having an exit aperture aligned with the axis of said material.

References Cited by the Examiner
UNITED STATES PATENTS

| | | | |
|---|---|---|---|
| 2,485,031 | 10/1949 | Bradley | 333—33 |
| 3,168,611 | 2/1965 | Strauss | 88—61 |

JEWELL H. PEDERSEN, *Primary Examiner.*

RONALD L. WIBERT, *Examiner.*